(12) United States Patent
Lee et al.

(10) Patent No.: US 11,145,263 B2
(45) Date of Patent: Oct. 12, 2021

(54) DISPLAY APPARATUS AND DRIVING METHOD THEREOF

(71) Applicant: SAMSUNG ELECTRONICS CO., LTD., Suwon-si (KR)

(72) Inventors: Minhoon Lee, Suwon-si (KR); Jaemoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/678,094

(22) Filed: Nov. 8, 2019

(65) Prior Publication Data

US 2020/0160802 A1  May 21, 2020

(30) Foreign Application Priority Data

Nov. 16, 2018 (KR) ........................ 10-2018-0141359

(51) Int. Cl.
*G09G 3/36* (2006.01)
*F21V 8/00* (2006.01)
*G09G 3/34* (2006.01)

(52) U.S. Cl.
CPC ......... *G09G 3/3607* (2013.01); *G02B 6/0068* (2013.01); *G09G 3/3413* (2013.01); *G09G 2360/141* (2013.01)

(58) Field of Classification Search
CPC ............... G09G 3/3413; G09G 3/3607; G09G 2360/141; G02B 6/0068
See application file for complete search history.

(56) References Cited

U.S. PATENT DOCUMENTS

| | | | |
|---|---|---|---|
| 7,777,834 B2 | 8/2010 | Uehara et al. | |
| 2002/0135553 A1* | 9/2002 | Nagai | G09G 3/3413 345/89 |
| 2006/0152468 A1 | 7/2006 | Ozaki | |
| 2008/0100551 A1 | 5/2008 | Haga et al. | |
| 2008/0303918 A1* | 12/2008 | Keithley | G09G 3/20 348/223.1 |
| 2010/0164919 A1 | 7/2010 | Yamamoto et al. | |
| 2016/0284284 A1 | 9/2016 | Liu et al. | |

(Continued)

FOREIGN PATENT DOCUMENTS

| | | |
|---|---|---|
| JP | 2009-009739 | 1/2009 |
| JP | 2013-205544 | 10/2013 |
| JP | 2016-035806 | 3/2016 |

(Continued)

OTHER PUBLICATIONS

Search Report and Written Opinion dated Feb. 17, 2020 in counterpart International Application No. PCT/KR2019/014576.

(Continued)

*Primary Examiner* — Kent W Chang
*Assistant Examiner* — Scott D Au
(74) *Attorney, Agent, or Firm* — Nixon & Vanderhye P.C.

(57) ABSTRACT

Disclosed is a display apparatus. The display apparatus includes a liquid crystal panel including a plurality of subpixels, a backlight unit including a white light source and a blue light source, and a processor configured to adjust the blue light source to emit light and to adjust an aperture ratio of at least one of the plurality of subpixels based on a color temperature of the white light source and a target color temperature.

17 Claims, 12 Drawing Sheets

(56) References Cited

U.S. PATENT DOCUMENTS

2017/0303365 A1  10/2017  Chen et al.
2018/0180910 A1* 6/2018  Li ...................... H01L 27/1259

FOREIGN PATENT DOCUMENTS

| KR | 10-2006-0030847 | 4/2006 |
| KR | 10-2009-0041029 | 4/2009 |
| KR | 10-2018-0002584 | 1/2018 |
| KR | 10-2018-0063608 | 6/2018 |

OTHER PUBLICATIONS

Extended Search Report dated Mar. 27, 2020 in counterpart European Patent Application No. 19202857.9.

* cited by examiner

110

DISPLAY APPARATUS AND DRIVING METHOD THEREOF

CROSS-REFERENCE TO RELATED APPLICATION

This application is based on and claims priority under 35 U.S.C. § 119 to Korean Patent Application No. 10-2018-0141359, filed on Nov. 16, 2018, in the Korean Intellectual Property Office, the disclosure of which is incorporated by reference herein in its entirety.

BACKGROUND

Field

The disclosure relates to a display apparatus and a driving method thereof and, for example, to a display apparatus including a backlight and a driving method thereof.

Description of Related Art

A liquid crystal display apparatus is a display apparatus to display a desired image by forming a liquid crystal layer having an anisotropic permittivity on an upper and a lower transparent insulating substrates, changing the molecular arrangement of a liquid crystal material by adjusting the intensity of the electric field formed in the liquid crystal layer thereafter, and adjusting the amount of light transmitted to a transparent insulating substrate.

As a liquid crystal display apparatus, a thin film transistor liquid crystal display device (TFT LCD) using a thin film transistor (TFT) as a switching device is mainly used, and the liquid crystal display apparatus includes a liquid crystal panel including pixels that are divided into crossed gate lines and data lines to display an image, a driver for driving the liquid crystal panel, a backlight unit for supplying light to the liquid crystal panel, and a color filter for transmitting light supplied to the liquid crystal panel.

The liquid crystal display apparatus uses a method of adjusting an aperture ratio of the liquid crystal to reach target color temperature. In this case, there is a problem in that, due to the loss of the aperture ratio of the liquid crystal, the brightness of the backlight is increased, and the contrast ratio is decreased.

SUMMARY

Embodiments of the disclosure address the above disadvantages and other disadvantages not described above.

The disclosure provides a display apparatus capable of adjusting color temperature by adding at least one of a blue light source or a red light source to a backlight and a driving method thereof.

A display apparatus includes a liquid crystal panel including a plurality of subpixels, a backlight unit comprising backlight circuitry and including a white light source and a blue light source, and a processor configured to adjust the blue light source to emit light and to adjust an aperture ratio of at least one of the plurality of subpixels based on a color temperature of the white light source and a target color temperature.

The plurality of subpixels may include a red subpixel, a green subpixel, and a blue subpixel, and the processor may, based on the target color temperature being higher than the color temperature of the white light source, control the blue light source to emit light and adjust an aperture ratio of at least one of green subpixel or blue subpixel to be greater than or equal to a threshold value.

The processor may, based on the target color temperature being lower than color temperature of the white light source, control the blue light source not to emit light.

The processor may adjust an aperture ratio of the red subpixel within a preset threshold range.

The backlight unit may further include a red light source, and the processor may, based on the target color temperature being lower than color temperature of the white light source, control the red light emitting element to emit light and adjust an aperture ratio of at least one of green subpixel or blue subpixel to be greater than or equal to a threshold value.

The processor may adjust a light emitting intensity based on a difference between the target color temperature and color temperature of a white light source.

The processor may, based on one of a plurality of display modes for targeting different color temperatures being selected, adjust a light emitting intensity of the blue light source and an aperture ratio of at least one of the plurality of subpixels based on the target color temperature of a selected display mode.

The aperture ratio may be a maximum aperture ratio of each of the plurality of pixels.

The display apparatus may further include a sensor, and the processor may adjust light emitting intensity of the blue light source and an aperture ratio of at least one of the plurality of subpixels based on illuminance information sensed by the sensor.

According to an example embodiment, a driving method of a display apparatus comprising a liquid crystal panel including a plurality of subpixels and a backlight unit including a white light source and a blue light source includes comparing color temperature of the white light source and target color temperature, and adjusting the blue light source to emit light and adjusting an aperture ratio of at least one of the plurality of subpixels based on the comparison.

The plurality of subpixels may include a red subpixel, a green subpixel, and a blue subpixel, and the adjusting may include, based on the target color temperature being higher than the color temperature of the white light source, controlling the blue light source to emit light and adjusting an aperture ratio of at least one of green subpixel or blue subpixel to be greater than or equal to a threshold value.

The adjusting may include, based on the target color temperature being lower than color temperature of the white light source, controlling the blue light source not to emit light.

The adjusting may include adjusting an aperture ratio of the red subpixel within a preset threshold range.

The backlight unit may further include a red light source, and the adjusting may include, based on the target color temperature being lower than color temperature of the white light source, controlling the red light emitting element to emit light and adjusting an aperture ratio of at least one of green subpixel or blue subpixel to be greater than or equal to a threshold value.

The adjusting may include adjusting a light emitting intensity based on a difference between the target color temperature and color temperature of the white light source.

The adjusting may include, based on one of a plurality of display modes for targeting different color temperatures being selected, adjusting a light emitting intensity of the blue light source and an aperture ratio of at least one of the plurality of subpixels based on the target color temperature of a selected display mode.

The aperture ratio may be a maximum aperture ratio of each of the plurality of pixels.

The adjusting may include controlling light emitting intensity of the blue light source and an aperture ratio of at least one of the plurality of subpixels based on illuminance information sensed by the sensor.

According to an embodiment, a non-transitory computer readable recording medium storing computer instructions which, when executed by a processor of a display apparatus comprising a liquid crystal panel including a plurality of subpixels and a backlight unit including a white light source and a blue light source, cause the display apparatus to perform operations including comparing color temperature of the white light source and target color temperature; and adjusting light emitting intensity of the blue light source and an aperture ratio of at least one of the plurality of subpixels based on the comparison result.

As described above, according to various example embodiments, the brightness of backlight may be lowered using the aperture ratio of a liquid crystal to the maximum. Accordingly, the characteristics of black and the contrast ratio may be improved.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
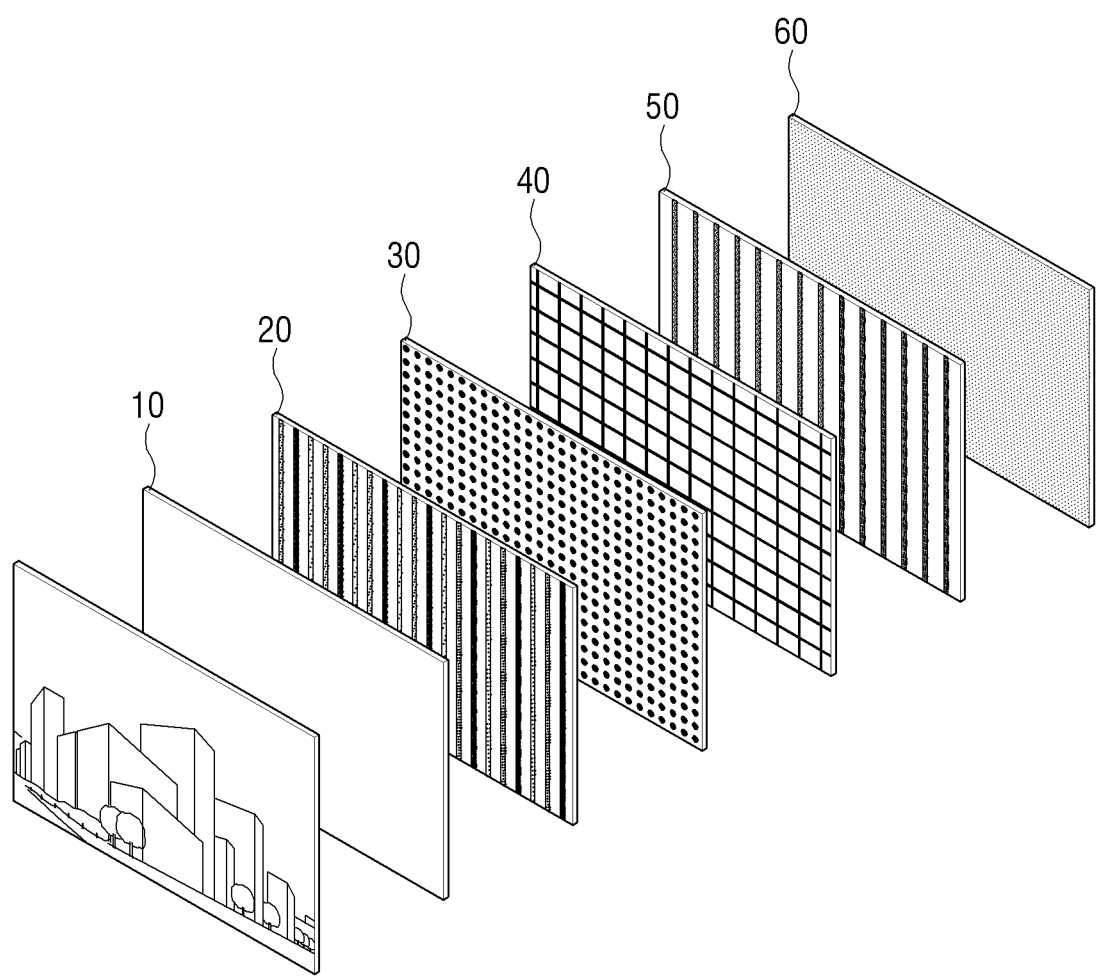
FIG. 1 is a diagram illustrating example characteristics of a display panel according to an embodiment.

The disclosure will be further described with reference to the attached drawings.

The terms used in this disclosure will be briefly described, and the disclosure will be described in greater detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms may be arbitrarily chosen. In this case, the meaning of such terms will be apparent from a corresponding description portion of the disclosure. Therefore, the terms used in embodiments of the disclosure should be defined based on the meaning of the terms and the contents throughout the disclosure rather than simple names of the terms.

In this disclosure, the expressions "have," "may have," "include," or "may include" or the like indicate the presence of a corresponding feature (for example: components such as numbers, functions, operations, or parts) and does not exclude the presence of additional feature.

The expression "At least one of A or/and B" should be understood to represent "A" or "B" or any one of "A and B".

As used herein, the terms "first," "second," or the like may denote various components, regardless of order and/or importance, and may be used to distinguish one component from another, and does not limit the components.

In addition, the description in the disclosure that one element (e.g., a first element) is "(operatively or communicatively) coupled with/to" or "connected to" another element (e.g., a second element) should be interpreted to include both the case in which the one element is directly coupled to the another element, and the case in which the one element is coupled to the another element through still another element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

Hereinafter, embodiments of the disclosure will be described in greater detail with reference to the accompanying drawings.

FIG. 1 is a diagram illustrating example characteristics of a display panel according to an embodiment.

A display panel according to an embodiment may be implemented as a liquid crystal display panel. The liquid crystal panel is a display panel implemented as a liquid crystal device which is a display device using a liquid crystal capable of electrically controlling the transmittance of light.

Since the liquid crystal panel is implemented as a liquid crystal device which does not emit light by itself, a backlight unit may be provided in order for the liquid crystal panel to implement an image. The backlight unit serves to emit light so that the display image is visible to the eyes. In general, a cathode fluorescent lamp (CCFL) backlight unit and a light emitting diode (LED) backlight unit may be used, but the disclosure is not limited thereto.

According to FIG. 1, the liquid crystal display panel according to an embodiment may include a first polarizing plate 10, a color filter 20, a liquid crystal 30, a thin film transistor matrix 40, a second polarizing plate 50, and a backlight unit (e.g., including backlight circuitry and light emitting elements) 60.

The liquid crystal panel may operate in such a manner that the liquid crystal 30 is injected between two glass plates, the injected liquid crystal 30 passes light through the ON/OFF of the thin film transistor 40 in a vertical orientation and a horizontal twist orientation, and the light is emitted to a screen through the color filter 20. In addition, the first polarizing plate 10 and the second polarizing plate 50 which conduct linear polarization for visible rays (natural light) may be attached to the two glass plates.

The LCD panel may be divided into a twisted nematic (TN) panel, in-plane switching (IPS) panel, vertical alignment (VA) panel, or the like, but is not limited thereto.

In the TN panel, when power is supplied, the liquid crystal molecules are vertically positioned, and when a maximum voltage is applied, light is blocked so that a black screen is output, and in the IPS panel, the liquid crystal molecules which are horizontally positioned are rotated in a side direction using a magnetic field. The VA panel operates in such a way that, when power is not input, the liquid crystal molecules are vertically positioned and when power is input, the liquid crystal molecules are driven horizontally to pass light.

As described above, in a display apparatus including a liquid crystal panel and a backlight unit, the backlight unit uses a white-based light source, and the color temperature of the white-based light source becomes the color temperature of the display apparatus. When another color temperature is to be implemented, instead of native color temperature, an aperture ratio (or permeability or transmittance) of the plurality of liquid crystal pixels forming the liquid crystal panel may be adjusted. When each pixel forming the liquid crystal panel is composed of R, G, and B subpixels, the color temperature increases in the order of R >G>B. Accordingly, the aperture ratio can be adjusted by relatively increasing the aperture ratio of B subpixel when it is necessary to increase color temperature, and by relatively increasing the aperture ratio of R subpixel when it is necessary to decrease color temperature. However, in this example, there is a problem in that there is a loss in the aperture ratio of the liquid crystal.

Various example embodiments will be described in which the color temperature of a display may be changed without loss of aperture ratio of the liquid crystal by adding at least one of a blue light source and red light source to the backlight unit.

Figure 2:
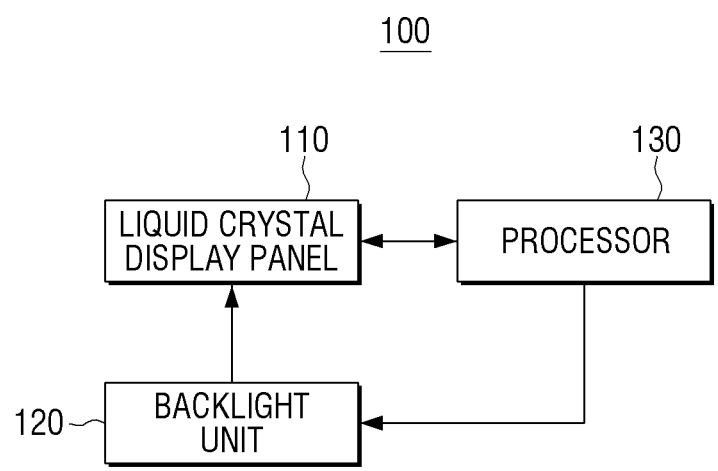
FIG. 2 is a block diagram illustrating an example configuration of the display apparatus according to an embodiment.

FIG. 2 is a block diagram illustrating an example configuration of the display apparatus according to an embodiment.

According to FIG. 2, a display apparatus 100 includes a liquid crystal panel 110, a backlight unit (e.g., including backlight circuitry and light emitting elements) 120, and a processor (e.g., including processing circuitry) 130.

The display apparatus 100 may include a smart phone, a tablet, a smart TV, an Internet TV, a web TV, an Internet Protocol Television (IPTV), signage, PC, smart TV, monitor, or the like, but is not limited thereto, and may be implemented as various types of apparatuses including a display function, such as a large format display (LFD), a digital signage, digital information display (DID), video wall, projector display, or the like.

The liquid crystal panel 110 includes a plurality of pixels, and each pixel may include a plurality of subpixels. For example, each pixel may include three subpixels corresponding to a plurality of lights, for example, red, green, and blue lights (R, G, and B). However, the embodiment is not limited thereto. In some cases, cyan, magenta, yellow, black, or other subpixels may be included, in addition to R, G, and B subpixels. Each subpixel may be implemented in a form including a liquid crystal element (liquid crystal molecules) and a color filter transmitting light corresponding to each subpixel.

The backlight unit 120 emits light to the display panel 110.

For example, the backlight unit 120 may illuminate the display panel 110 with light on a rear side of the display panel 110, that is, an opposite side of the side where an image is displayed.

The backlight unit 120 may include a plurality of light sources, and the plurality of light sources may include, but are not limited to, a linear light source such as a lamp or a point light source such as a light emitting diode, or the like. The backlight unit 120 may be implemented as a direct type backlight unit or an edge type backlight unit. The light source of the backlight unit 120 may include one or two or more light sources among a light emitting diode (LED), a hot cathode fluorescent lamp (HCFL), a cold cathode fluorescent lamp (CCFL), an external electrode fluorescent lamp (EFEM), an ELP, and FFL, but is not limited thereto.

According to an example embodiment, the backlight unit 120 may include a white light source and a blue light source. According to another embodiment, the backlight unit 120 may include a white light source, a blue light source, and a red light source. For example, at least one of the white light source, the blue light source, or the red light source may be implemented to perform the same function as the W, G, and B LEDs by applying a light conversion material corresponding to each light source to the Blue LED. In this example, the blue light source may be applied with a light conversion material for improving the luminescent color, but the blue LED may emit blue light, and thus, a separate light conversion material may not be applied.

For example, the number of white light sources and blue light sources included in the backlight unit 120 may be N:1 (N≥1). In addition, the number of white light sources and red light sources may be N:1 (N≥1). When both the blue light source and the red light source are included in the backlight unit 120, the number of blue light source and red light source may be a ratio of N:1 (N≥1) or 1:N (N≥1).

The backlight unit 120 may include a diffuser plate to diffuse light so that light emitted from a light source maintains uniform brightness.

The processor 130 may include various processing circuitry and controls overall operations of the display apparatus 100.

According to an embodiment, the processor 130 may, for example, and without limitation, be implemented with a digital signal processor (DSP), a microprocessor, an artificial intelligence (AI) processor and a time controller (TCON) which process a digital image signal, but this is not limited thereto. The processor 120 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor, or the like, or may be defined as a corresponding term. The processor 130 may be implemented in a system on chip (SoC) type or a large scale integration (LSI) type which a processing algorithm is built therein or in a field programmable gate array (FPGA) type. The processor 130 may perform various functions by executing computer executable instructions stored in the memory 120.

The processor 130 drives the backlight unit 120 to provide light to the display panel 110. For example, the processor 130 adjusts and outputs at least one supply time and intensity of the driving current (or driving voltage) supplied to the backlight unit 120. For example, the processor 130 may control brightness of light sources included in the backlight unit 120 by pulse width modulation (PWM) with a variable duty ratio, or control the brightness of the light sources of the backlight unit 120 by varying the intensity of current. Here, the PWM signal controls the lighting and lights-out ratio of the light sources, and the duty ratio (%) is determined according to the dimming value input from the processor 130.

In this example, the processor 130 may be implemented to include a driver integrated circuit (IC) for driving the backlight unit 120. For example, the processor 130 may be implemented as a digital signal processor (DSP) and implemented with a digital driver IC as one chip. However, the driver IC may be implemented by hardware separate from the processor 130. For example, when the light sources included in the backlight unit 120 are implemented as LED devices, the driver IC may be implemented with at least one LED driver that controls a current applied to the LED. According to an example embodiment, the LED driver may be disposed at the rear end of a power supply (for example, a switching mode power supply (SMPS)) to receive a voltage from the power supply. However, according to another embodiment, a voltage may be applied from a separate power supply device. It is also possible that the SMPS and LED drivers are implemented in one integrated module.

According to an example embodiment, the processor 130 may control whether the blue light source emits light based on the color temperature of the white light source included in the backlight unit 120 and the target color temperature. Further, the processor 130 may adjust at least one aperture ratio among a plurality of subpixels included in the liquid crystal panel 110 based on the color temperature of the white light source and the target color temperature. In addition, the processor 130 may control the light emitting intensity of the blue light source based on the color temperature of the white light source and the target color temperature. The target color temperature may be determined based on the display mode, but is not limited thereto.

As the color temperature of the blue light source is higher than the color temperature of the white light source, the processor 130 may adjust whether the blue light source emits light or the intensity of light emission based on the target color temperature.

For example, when the target color temperature is higher than the color temperature of the white light source, the processor 130 may control the blue light source to emit light. In this example, the processor 130 may adjust the light emitting intensity of the blue light source by considering various information including at least one of a color temperature difference between the target color temperature and a color temperature of the white light source, the number of the blue light sources, or the number of the white light sources.

According to an embodiment, a plurality of subpixels may include red, green, and blue subpixels.

In this example, when the target color temperature is higher than the color temperature of the white light source, the processor 130 may control the blue light source to emit light and adjust the aperture ratio of at least one of the green or blue subpixels to be greater than or equal to a threshold. In addition, the aperture ratio of the red subpixel may also be controlled so that loss of the aperture ratio is minimized within the scope of implementing the desired color temperature.

The aperture ratio may refer, for example, to the maximum aperture ratio of each of the plurality of pixels, and the maximum aperture ratio may be the maximum aperture ratio of each of the plurality of pixels corresponding to the maximum gray scale level. For example, the digital image has a gray scale value according to the number of bits. For example, the entire gray scale segment of the 8-bit image is 0-255 level segments. In this example, the maximum aperture ratio may be the aperture ratio corresponding to 255 level. When the target color temperature is higher than the color temperature of the white light source, the processor 130 may control the blue light source to emit light, and adjust the maximum aperture ratio of at least one of the green or blue subpixels to be greater than or equal to the maximum aperture ratio. The processor 130 may control the maximum aperture ratio of the red subpixel so that the aperture ratio loss may be minimized in a range of implementing desired color temperature.

Adjusting the aperture ratio in the disclosure may refer, for example, to adjusting the maximum aperture ratio corresponding to the maximum grayscale value. Accordingly, those skilled in the art may understand that adjusting the aperture ratio of each subpixel based on the gray scale value of an image is a concept that is different from the concept of adjusting the aperture ratio in accordance with the disclosure.

According to the related-art, if the target color temperature is higher than the color temperature of the white light source included in the backlight unit, the aperture ratio of the blue subpixel had to be adjusted to be higher than the aperture ratio of the green and red subpixels, and therefore, it was not possible to avoid the aperture ratio loss of the green and red subpixels. However, according to the disclosure, adjusting the color temperature is possible using a blue light source and accordingly, the aperture ratio loss of the green and red subpixels may be minimized and/or reduced.

When the target color temperature is lower than or equal to the color temperature of the white light source, the processor 130 may control the blue light source not to emit light. For example, the processor 130 may control only the white light source included in the backlight unit 120 to emit light. The target color temperature being equal to the color temperature of the white light source may include a predetermined error range. For example, even if the target color temperature is higher than the color temperature of the white light source, if it falls within the predetermined error range, which is higher than the color temperature of the white light source, it may be assumed that the color temperatures are identical, and the blue light source may be controlled not to emit light.

According to another embodiment, the backlight unit 120 may further include not only white light source and blue light source, but also red light source.

When the target color temperature is lower than the color temperature of the white light source, the processor 130 may control the red light source to emit light. In addition, the processor 130 may adjust the aperture ratio of at least one of the green or blue subpixels to a threshold value or more. This is to reduce the aperture ratio loss of the green or blue subpixel as much as possible, since a desired color temperature may be provided according to the emission of the red light source. In addition, the processor 130 may adjust the aperture ratio of the red subpixel within a predetermined threshold range in some cases. For example, the processor 130 may adjust the aperture ratio of the red subpixel to compensate the color temperature due to the light emission of the red light source within a range that minimizes the aperture ratio loss of the red subpixel.

According to another embodiment, the color temperature of the white light source included in the backlight unit 120 may be different based on the manufacturer. Accordingly, a combination of light sources included in the backlight unit 120 may be determined based on the color temperature of the white light source.

For example, if the color temperature of the white light source is 6500K to 8500K, the white light source and the blue light source may be included in the backlight unit 120, if the color temperature of the white light source is 10000K to 12000K, the white light source and the red light source may be included in the backlight unit 120, and if the color temperature of the white light source is 8500K to 1000K, white light source, blue light source, and red light source may be included in the backlight unit 120.

When the white light source, blue light source, and red light source are included in the backlight unit 120, a light emission combination may be determined based on the color temperature of the white light source.

For example, if the color temperature of the white light source is 6500K to 8500K, the combination of white light source and the blue light source may be used, when the color temperature of the white light source is 10000K to 12000K, the combination of the white light source and the red light source may be used, and when the color temperature of the white light source is 8500K to 1000K, the combination of the white light source, the blue light source, and the red light source may be used.

The processor 130 may provide a plurality of display modes that target different color temperatures. For example, the processor 130 may provide a first mode to provide a color temperature around 6500K, a second mode to provide a color temperature around 10000K, and a third mode to provide a color temperature around 12000K. For example, each mode may be a mode that provides a threshold range of color temperatures including a reference temperature, that is, 6500K, 10000K, and 12000K. For example, the first mode may be, but is not limited to, a movie mode, a second mode may be a standard mode, and a third mode may be a dynamic mode (or shop mode).

When one of the plurality of display modes is selected, the processor 130 may adjust at least one of light emission or light emitting intensity of the blue light source based on the target color temperature of the selected display mode if one of the plurality of display modes is selected. Further, the processor 130 may adjust the aperture ratio of at least one of the plurality of subpixels, as well as the blue light source.

Figure 3A:
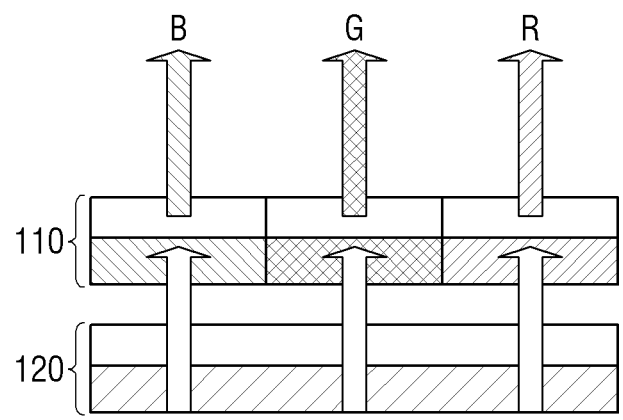
FIG. 3A is a diagram illustrating an example light emitting effect of blue light source according to an embodiment.
Figure 3B:
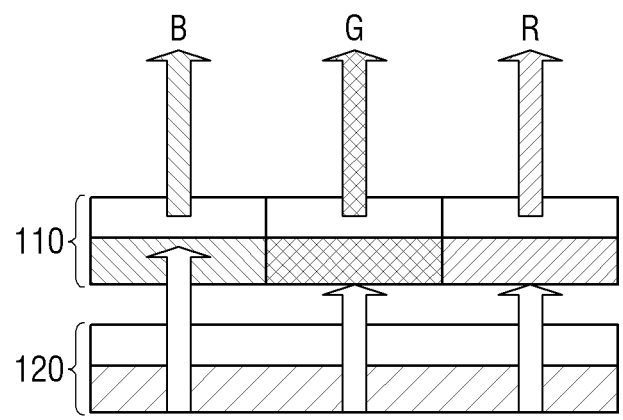
FIG. 3B is a diagram illustrating an example light emitting effect of blue light source according to an embodiment.

FIG. 3A and FIG. 3B are diagrams illustrating a light emitting effect of blue light source according to an embodiment.

FIG. 3A illustrates the case where only the white light source included in the backlight unit 120 is controlled to emit light. According to an embodiment of the disclosure, when the target color temperature matches the color temperature of the white light source, the aperture ratio of the liquid crystals corresponding to the subpixels of each pixel included in the liquid crystal panel 110 may be maximized and/or increased to reduce the aperture ratio loss.

FIG. 3B illustrates a case where the white light source and the blue light source included in the backlight unit 120 emit light together. According to an embodiment, when the target color temperature is higher than the color temperature of the white light source, the blue light source may be controlled to emit light to maximize and/or increase the aperture ratio of a liquid crystal corresponding to the green subpixel and minimize and/or reduce a decrease in aperture ratio of the liquid crystal corresponding to the red subpixels.

For example, in the case of the backlight unit including only the white light source, as illustrated in FIG. 3B when the target color temperature is higher than the color temperature of the white light source, the aperture ratio of the liquid crystal corresponding to the blue subpixel needs to be greater than the aperture ratio of the liquid crystal corresponding to the green and red subpixels. Therefore, it was not possible to avoid the liquid crystal aperture ratio corresponding to the green and red subpixels. However, according to the disclosure, when the target color temperature is higher than the color temperature of the white light source, as illustrated in FIG. 3B, blue color light may be supplemented by controlling the blue light source included in the backlight unit 120 to emit light and thus, the aperture ratio loss of the liquid crystal may be minimized and/or reduced.

In the related-art, in accordance with decrease in the aperture ratio of the liquid crystal to achieve the target color temperature, in order to provide the equal brightness, the light emitting intensity of the backlight unit 120 needs to be improved. However, according to the disclosure, it is not necessary to increase the light emitting intensity of the backlight unit 120. In addition, even if the light emitting intensity of the backlight unit 120 is less than the intensity of the related-art, the same brightness (luminance) that is equal to the related art may be provided. Accordingly, the black characteristics and brightness characteristics are improved and thus, the contrast ratio may be improved.

Figure 4A:
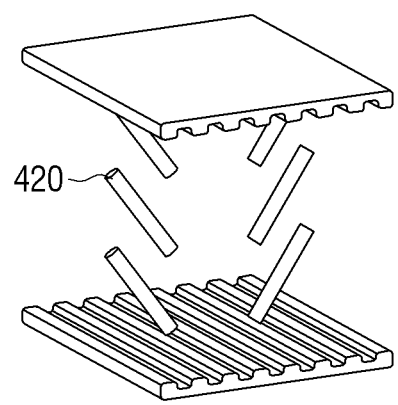
FIG. 4A is a diagram illustrating an example operation of a backlight unit according to an embodiment.
Figure 4B:
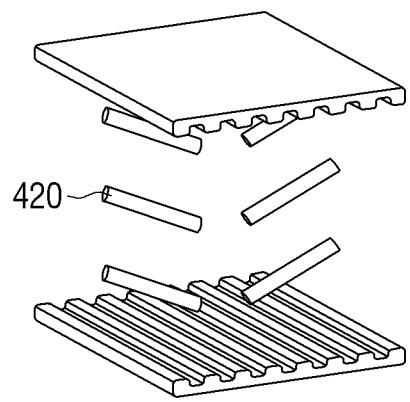
FIG. 4B is a diagram illustrating an example operation of a backlight unit according to an embodiment.
Figure 4C:
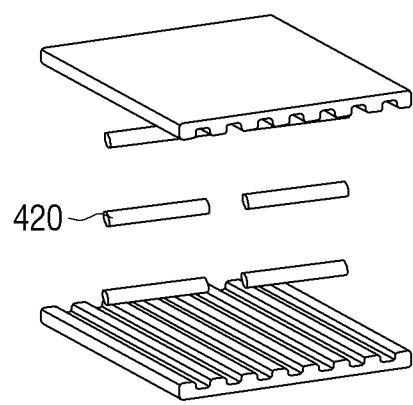
FIG. 4C is a diagram illustrating an example operation of a backlight unit according to an embodiment.

FIG. 4A, 4B and FIG. 4C are diagrams illustrating an example operation of a backlight unit according to an embodiment.

In FIGS. 4A, 4B and 4C, a VA panel is described as an example for convenient description. However, it will be understood that the disclosure is not limited thereto.

When the VA panel is not powered on, as illustrated in FIG. 4A, the liquid crystal molecules 420 are positioned substantially vertically, and then, when the VA panel is powered on, the molecules 420 are driven substantially horizontally as illustrated in FIG. 4B (middle voltage) and horizontally as illustrated in FIG. 4C (maximum voltage). As illustrated in FIG. 4A, when the liquid crystal molecules are in a vertical direction, the backlight light is blocked, power is on, and when the liquid crystal molecules are in a horizontal direction as FIG. 4B (middle voltage) and FIG. 4C (maximum voltage), light passes. As such, by appropriately controlling vertical or horizontal orientation statue of the liquid crystal molecules, the aperture ratio of the liquid crystal may be adjusted.

Figure 5A:
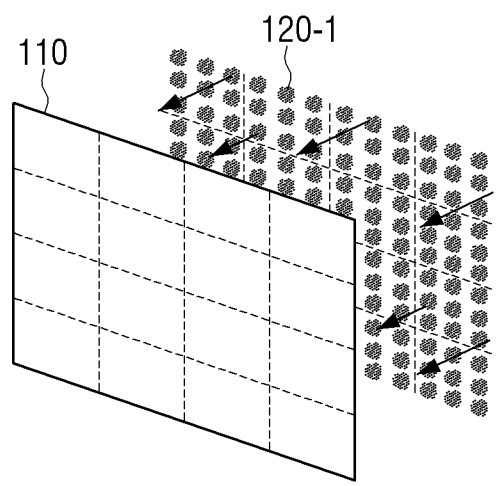
FIGS. 5A and 5B are diagrams illustrating an example operation of a display apparatus according to an embodiment
Figure 5B:
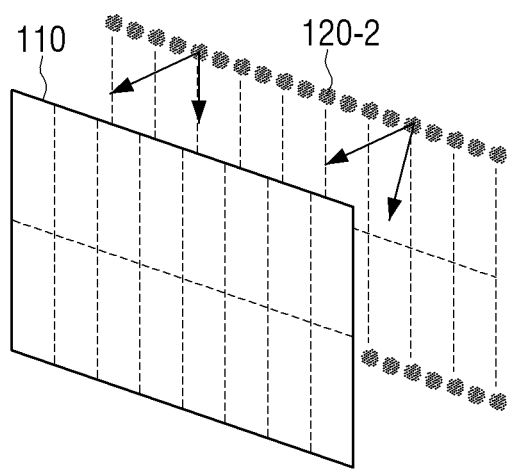

FIGS. 5A and 5B are diagrams illustrating an example operation of the backlight unit according to an embodiment.

According to an embodiment, the backlight unit, as illustrated in FIG. 5A, may be implemented as a direct type backlight unit 120-1. For example, the direct type backlight unit 120-1 may be implemented with a structure that a plurality of optical sheets and diffuser plate are layered at a lower portion of the display panel 110 and a plurality of light sources are disposed at a lower portion of the diffuser plate.

The direct type backlight unit 120-1 may be divided into a plurality of backlight blocks as illustrated in FIG. 5A based on the arrangement structure of a plurality of light sources. In this case, each of the plurality of backlight blocks may be driven respectively according to the current duty based on image information of a corresponding screen region as illustrated.

According to another embodiment, the backlight unit may be implemented as an edge-type backlight unit 120-2 as illustrated in FIG. 5B. For example, the edge-type backlight unit 120-2 may be implemented with a structure that a plurality of optical sheets and diffuser plate are layered at a lower portion of the display panel 110 and a plurality of light sources are disposed at a side of the lower portion of the light guide panel.

The edge-type backlight unit 120-2 may be divided into a plurality of backlight blocks as illustrated in FIG. 5B based on the structure of arrangement of a plurality of light sources. In this case, each of the plurality of backlight blocks may be driven respectively according to the current duty based on image information of corresponding screen region as illustrated.

As illustrated in FIGS. 5A and 5B, when the backlight units 120-1 and 120-2 are implemented as a plurality of backlight blocks, each backlight block may include white light source and blue light source. Alternatively, each backlight block may include white light source, blue light source, and red light source.

For example, the number of white light sources and blue light sources included in each backlight block may be N:1 (N≥1) ratio. In addition, the number of white light sources and red light sources may be N:1 (N≥1). If the blue light source and the red light source are all included in each backlight block, the number of blue light sources and red light sources may be N:1 (N≥1) ratio or 1:N (N≥1) ratio.

Figure 6:
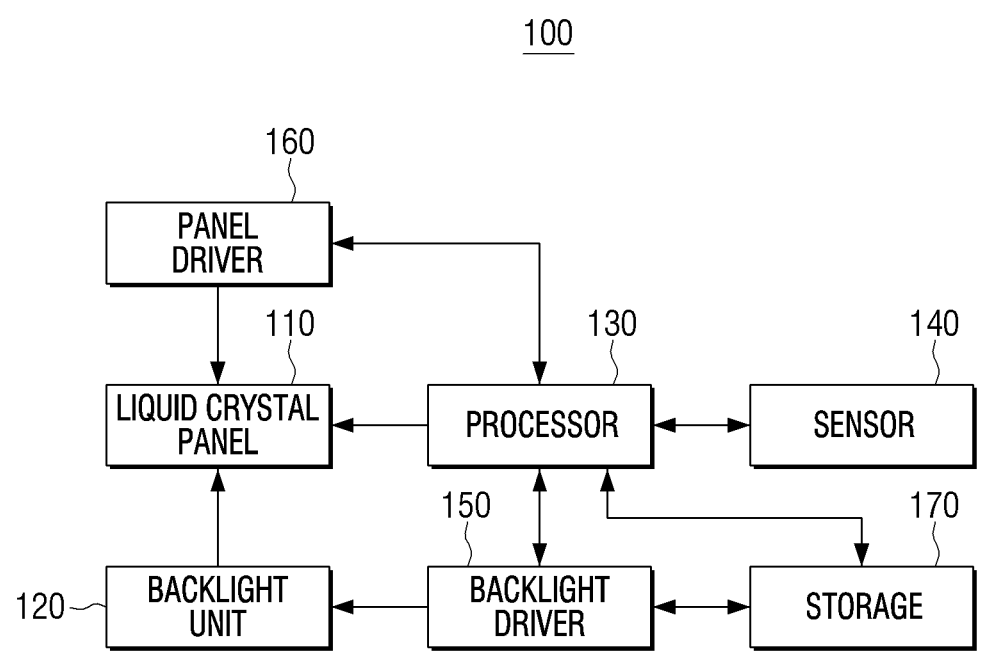
FIGS. 6 and 7 are block diagrams illustrating an example configuration of a display apparatus according to an embodiment.
Figure 7:
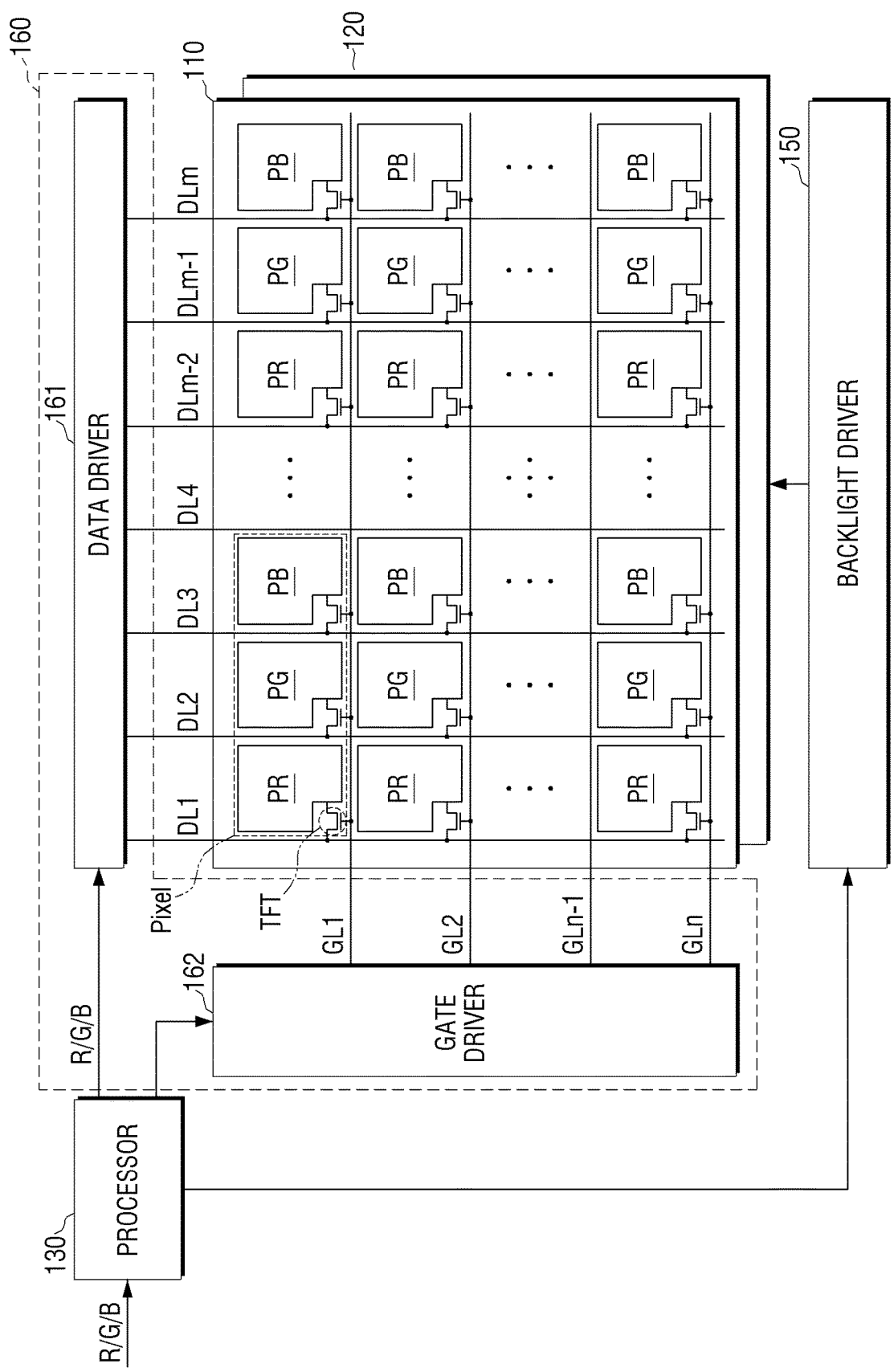

FIGS. 6 and 7 are block diagrams illustrating example configurations of the display apparatus according to an embodiment.

Referring to FIG. 6, the display apparatus 100 includes the liquid crystal panel 110, the backlight unit (e.g., including backlight circuitry and/or light emitting elements) 120, the processor (e.g., including processing circuitry) 130, the sensor 140, a backlight driver (e.g., including backlight driving circuitry) 150, a panel driver (e.g., including panel driving circuitry) 160, and a storage 170. The configurations of FIGS. 5A and 5B which are overlapped with the configurations of FIG. 2 may not be further described.

The sensor 140 senses external light.

For example, the sensor 140 may sense at least one of a variety of characteristics such as illumination, intensity, color, direction of incidence, incident area, distribution, or the like, of light. According to an embodiment, the sensor 140 may be an illumination sensor, a temperature sensor, a light amount sensing layer, a camera, or the like. In particular, the sensor 140 may be implemented with an illumination sensor that senses RGB light, but is not limited thereto, and may be applicable to any device capable of sensing, such as a white sensor, IR sensor, IR+RED sensor, a heart rate monitor (HRM) sensor, a camera, or the like.

At least one sensor 140 may be provided, and when a plurality of sensors 140 are provided, any position from which illuminance of different directions may be measured is applicable. For example, the second sensor may be provided at a location capable of sensing illumination of different directions of an angle which is different by 90° or more relative to the first sensor. In one example, the sensor 140 may be disposed within a glass provided in the display panel 110.

For some cases, the processor 130 may control a corresponding operation of the backlight unit 120 based on at least one of color temperature or intensity of external light sensed by the sensor 140.

According to an example embodiment, at least one of the color temperature or intensity of the external light may affect the color temperature of the image provided through the display panel 110. Accordingly, the processor 130 may control the operation of the backlight unit 120 in consideration of not only illuminance but also target color temperature, color temperature of white, blue, and red light sources.

For example, when the target color temperature is higher than the color temperature of the white light source and blue light source emits light, if it is determined that the color temperature becomes lower to some extent by the external illuminance, the light emitting intensity of the blue light source may be adjusted based thereon.

FIG. 7 is block diagram illustrating an example method for driving the display apparatus according to an embodiment.

The display panel 110 is formed such that the gate lines GL1 to GLn and the data lines DL1 to DLm cross each other, and R, G, B sub-pixels PR, PG, PB are formed at the area provided by the cross. The adjacent R, G, B sub-pixels PR, PG, PB form one pixel. That is, each pixel reproduces color of the subject with three primary colors of red R, green G, and blue B including R subpixel PR representing red R, G subpixel PG representing green G, and B subpixel PB representing blue B.

When the display panel 110 is implemented as an LCD panel, each subpixel PR, PG and PB may include a pixel electrode and a common electrode, and the light transmittance is changed while the liquid crystal alignment is changed to the electric field formed with the potential difference between both electrodes. TFTs formed at a cross portion of gate lines (GL1 to GLn) and data lines (DL1 to DLm) supply video data from data lines (DL1 to DLm), that is, R, G, and B data, to pixel electrodes of each subpixel PR, PG, and PB, in response to scan pulse from each gate line (GL1 to GLn).

The backlight driver 150 may be implemented as a type to include a driver IC to drive the backlight unit 120. According to one example, the driver IC may be implemented as the processor 130 and a separate hardware. For example, when the light sources included in the backlight unit 120 are implemented as LED elements, the driver IC may be implemented with at least one LED driver that controls the current applied to the LED element. According to an example embodiment, the LED driver may be disposed at the rear end of a power supply (for example, a switching mode power supply (SMPS)) to receive a voltage from the power supply. However, according to another embodiment, a voltage may be applied from a separate power supply. Alternatively, it is also possible that the SMPS and LED drivers are implemented in one integrated module form.

The panel driver 160 may be implemented as a type to include the driver IC for driving the display panel 110. According to an embodiment, the driver IC may be implemented as hardware separate from the processor 130. For example, the panel driver 160 may include the data driver 161 for supplying video data to data lines and the gate driver 162 for supplying the scan pulse to the gate lines.

The data driver 161 may include various circuitry for generating a data signal, and generates a data signal by receiving image data of R/G/B from the processor 130 (or timing controller (not shown)). Also, the data driver 161 may apply, to the display panel 110, the data signal that is generated through connection to the data lines (DL1, DL2, DL3, . . . , DLm) of the display panel 110.

The gate driver 162 (or scan driver) may include various circuitry for generating a gate signal (or a scan signal), which is connected to the gate lines (GL1, GL2, GL3, GLn) and transfers the gate signal to a specific row of the display panel 110. To a pixel to which the gate signal is transferred, a data signal output from the data driver 161 is transferred.

The panel driver 160 may further include a timing controller (not shown). The timing controller (not shown) may receive an input signal IS, a horizontal synchronizing signal Hsync, a vertical synchronizing signal Vsync, and a main clock signal MCLK, or the like, from the outside, for example, the processor 130, generate an image data signal, a light emission control signal, a data control signal, an emission control signal, or the like, and provide the signals to the display panel 110, the data driver 161, the gate driver 162, or the like.

The storage 170 stores various data necessary for operating the display device 100.

For example, the storage 170 may store data necessary for the processor 130 to execute various processing. For example, the storage 170 may be implemented as an internal memory such as the read-only memory (ROM), random access memory (RAM), or the like, included in the processor 130, or a memory separate from the processor 130. In this case, the storage 170 may be implemented as a memory type embedded in the display apparatus 100 according to a data storage use, or a memory type detachable from the display apparatus 100. For example, the data for driving the display apparatus 100 may be stored in a memory embedded in the display apparatus 100, and the data for expansion of the display apparatus 100 may be stored in a memory detachable from the display apparatus 100. The memory embedded in the display apparatus 100 may be implemented as a format such as a non-volatile memory, a volatile memory, a hard disk drive (HDD) or a solid state drive (SSD), or the like, and a memory detachable from the display apparatus 100 may be implemented as a format such as a memory card (for example, a micro secure digital (SD) card, a universal serial bus (USB) memory, or the like), an external memory connectable to the USB port (for example, USB memory), or the like.

According to an example, the storage 170 may store various information necessary for an operation according to various embodiments of the disclosure such as color temperature information of white light source included in the backlight unit 120, whether to emit light by the blue light source according to the difference between the color temperature of the white light source and the target color temperature, information of aperture ratio of at least one of a plurality of subpixels according to the difference between the color temperature of white light source and the target color temperature, and color temperature information in each display mode, or the like.

According to another embodiment, the information stored in the storage 170 may not be stored in the storage 170, but obtained from an external device. For example, some information may be received from an external device such as a set-top box, an external server, a user terminal, or the like, on, for example, a real-time basis.

Figure 8:
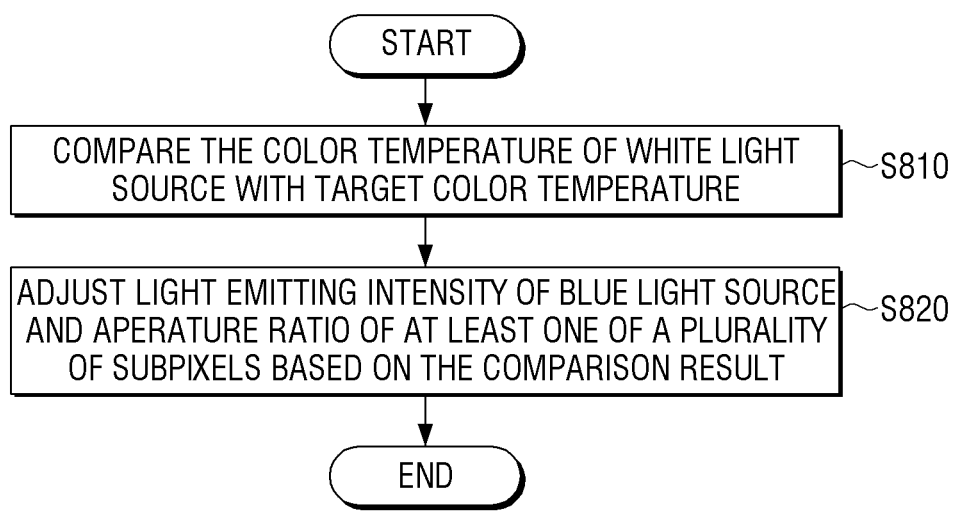
FIG. 8 is a flowchart illustrating an example method for driving a display apparatus according to an embodiment.

FIG. 8 is a flowchart illustrating an example driving method of the display apparatus according to an embodiment.

According to a driving method of the display apparatus of FIG. 8, color temperature of white light source included in the backlight unit is compared with the target color temperature in step S810.

Based on a comparison result, whether to emit light by the blue light source and aperture ratio of at least one of a plurality of subpixels included in the liquid crystal panel are adjusted based on the comparison result in step S820.

The plurality of subpixels may include red, green, and blue subpixels and in step S820, when the target color temperature is higher than the color temperature of white light source, blue light source may be controlled to emit light, and aperture ratio of at least one of green or blue subpixels may be adjusted to be higher than or equal to a threshold value.

In step S820, when the target color temperature is lower than the color temperature of the white light source, blue light source may be controlled not to emit light.

In step S820, the aperture ratio of red subpixel may be adjusted within a preset threshold scope.

The backlight unit may further include the red light source, and in step S820, if the target color temperature is lower than the color temperature of the white light source, the red light emitting elements may emit light, and the aperture ratio of at least one of green or blue subpixels may be adjusted to be greater than or equal to the threshold value.

In step S820, the light emitting intensity of blue light source may be adjusted based on the difference of the target color temperature and the color temperature of the white light source.

In step S820, when one of a plurality of display models for targeting different color temperatures is selected, light emitting intensity of the blue light source and the aperture ratio of at least one subpixels may be adjusted based on the target color temperature of the selected display mode.

The aperture ratio may be the maximum aperture ratio of each of the plurality of pixels.

In step S820, the light emitting intensity of the blue light source and the aperture ratio of at least one of a plurality of subpixels may be adjusted based on the illuminance information sensed by the sensor.

According to various embodiments of the disclosure as described above, the aperture ratio of a liquid crystal may be used to the maximum to lower the backlight brightness. Accordingly, black characteristic and contrast ratios may be improved. In addition, it is possible to provide a brighter screen at the same backlight brightness In the above-described embodiments, for example, various control information for backlight control has been described as being calculated by the display apparatus, but in some cases, it is possible that the information is calculated by a separate image processing apparatus (not shown) not having the display panel. For example, an image processing apparatus may be implemented as various apparatuses capable of performing image processing, such as a set-top box that provides an image signal to a display panel, a sending box, or the like.

The methods according to the various embodiments of the disclosure may be implemented as a type of an application installable in an existing electronic device.

In addition, the methods according to various embodiments may be implemented with software upgrade or hardware upgrade for the conventional electronic apparatus.

The various embodiments may be performed through an embedded server provided in the electronic apparatus or an external server of at least one of the electronic apparatus and the display apparatus.

According to an embodiment, the various embodiments as described above may be implemented with software including instructions stored in the machine-readable storage media readable by a machine (e.g., computer). The apparatus may be an apparatus which may call instructions from the storage medium and operates according to the called instructions, and may include an electronic apparatus (e.g., electronic apparatus (A)) in accordance with the disclosed embodiments. When an instruction is executed by a processor, the processor may perform functions corresponding to the instruction, either directly or under the control of the processor, using other components. The instructions may include a code made by a compiler or a code executable by an interpreter. A machine-readable storage medium may be provided in the form of a non-transitory storage medium. A, "non-transitory" storage medium may be a storage medium that does not include a signal and is tangible, but does not distinguish whether data is stored semi-permanently or temporarily on the storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some subelements of the abovementioned subelements may be omitted, the elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While various example embodiments have been shown and described, the disclosure is not limited to the example embodiments, and it will be understood by those of ordinary skill in the art that various changes in form and details may be made therein without departing from the spirit and scope as defined, for example, by the following claims and their equivalents.

What is claimed is:

1. A display apparatus comprising:
  a liquid crystal panel including a plurality of subpixels;
  a backlight unit comprising backlight circuitry and including a white light source and a blue light source; and
  a processor configured to:
    identify a difference between a color temperature of the white light source and a target color temperature; and
    control the display apparatus to adjust a light emitting intensity of the blue light source and adjust an aperture ratio of at least one of the plurality of subpixels based on the identified difference between the color temperature of the white light source and the target color temperature.

2. The display apparatus of claim 1, wherein the plurality of subpixels comprises a red subpixel, a green subpixel, and a blue subpixel, and
  wherein the processor is configured to control the blue light source to emit light and adjust an aperture ratio of at least one of green subpixel or blue subpixel to be greater than or equal to a threshold value based on the target color temperature being higher than the color temperature of the white light source.

3. The display apparatus of claim 2, wherein the processor is configured to control the blue light source to not emit light based on the target color temperature being lower than color temperature of the white light source.

4. The display apparatus of claim 3, wherein the processor is configured to adjust an aperture ratio of the red subpixel within a preset threshold range.

5. The display apparatus of claim 3, wherein the backlight unit further comprises a red light source, and
  wherein the processor is configured to control the red light source to emit light and to adjust an aperture ratio of at least one of green subpixel or blue subpixel to be greater than or equal to a threshold value based on the target color temperature being lower than color temperature of the white light source.

6. The display apparatus of claim 1, wherein the processor is configured to adjust a light emitting intensity of the blue light source and to adjust an aperture ratio of at least one of the plurality of subpixels based on a target color temperature of a selected display mode based on one of a plurality of display modes for targeting different color temperatures being selected.

7. The display apparatus of claim 1, wherein the aperture ratio is a maximum aperture ratio of each of the plurality of subpixels.

8. The display apparatus of claim 1, further comprising:
  a sensor,
  wherein the processor is configured to adjust light emitting intensity of the blue light source and an aperture ratio of at least one of the plurality of subpixels based on illuminance information sensed by the sensor.

9. A method of driving a display apparatus comprising a liquid crystal panel including a plurality of subpixels and a backlight unit including a white light source and a blue light source, the method comprising:
  identify a difference between a color temperature of the white light source and a target color temperature based on comparison between the color temperature of the white light source and the target color temperature; and
  adjusting a light emitting intensity of the blue light source and adjusting an aperture ratio of at least one of the plurality of subpixels based on the identified difference between the color temperature of the white light source and target color temperature.

10. The method of claim 9, wherein the plurality of subpixels comprises a red subpixel, a green subpixel, and a blue subpixel, and
  wherein the adjusting comprises controlling the blue light source to emit light and adjusting an aperture ratio of at least one of green subpixel or blue subpixel to be greater than or equal to a threshold value based on the target color temperature being higher than the color temperature of the white light source.

11. The method of claim 10, wherein the adjusting comprises controlling the blue light source to not emit light based on the target color temperature being lower than color temperature of the white light source.

12. The method of claim 11, wherein the adjusting comprises adjusting an aperture ratio of the red subpixel within a preset threshold range.

13. The method of claim 11, wherein the backlight unit further comprises a red light source,
  wherein the adjusting comprises controlling the red light source to emit light and adjusting an aperture ratio of at least one of green subpixel or blue subpixel to be greater than or equal to a threshold value based on the target color temperature being lower than color temperature of the white light source.

14. The method of claim 9, wherein the adjusting comprises adjusting a light emitting intensity of the blue light source and an aperture ratio of at least one of the plurality of subpixels based on a target color temperature of a selected display mode based on one of a plurality of display modes for targeting different color temperatures being selected.

15. The method of claim 9, wherein the aperture ratio is a maximum aperture ratio of each of the plurality of subpixels.

16. The method of claim 9, wherein the adjusting comprises adjusting light emitting intensity of the blue light source and an aperture ratio of at least one of the plurality of subpixels based on illuminance information sensed by a sensor.

17. A non-transitory computer readable recording medium storing computer instructions which, when executed by a processor of a display apparatus comprising a liquid crystal panel including a plurality of subpixels and a backlight unit including a white light source and a blue light source, cause the display apparatus to perform operations including:
   identifying a difference between a color temperature of the white light source and a target color temperature based on comparison between the color temperature of the white light source and the target color temperature; and
   adjusting a light emitting intensity of the blue light source and an aperture ratio of at least one of the plurality of subpixels based on the identified difference between the color temperature of the white light source and target color temperature.

* * * * *